(12) United States Patent
Lin

(10) Patent No.: US 6,927,762 B2
(45) Date of Patent: Aug. 9, 2005

(54) APPLICATION SPECIFIC INTEGRATED CIRCUIT (ASIC) OF THE ELECTROMAGNETIC-INDUCTION SYSTEM

(75) Inventor: Chung-Chen Lin, Hsin-Chu (TW)

(73) Assignee: Aiptek International Inc., Hsin-Chu (TW)

( * ) Notice: Subject to any disclaimer, the term of this patent is extended or adjusted under 35 U.S.C. 154(b) by 492 days.

(21) Appl. No.: 10/109,699

(22) Filed: Apr. 1, 2002

(65) Prior Publication Data
US 2003/0184530 A1 Oct. 2, 2003

(51) Int. Cl.$^7$ ............................. G09G 5/00; G08C 21/00
(52) U.S. Cl. ..................................... 345/174; 178/18.07
(58) Field of Search ................................ 345/173–180; 178/18.07, 18.08, 19.04; 455/566

(56) References Cited

U.S. PATENT DOCUMENTS 5,693,914 A * 12/1997 Ogawa ..................... 178/18.07
5,986,646 A * 11/1999 Chen et al. ................. 345/173
6,005,555 A * 12/1999 Katsurahira et al. ........ 345/174
6,131,046 A * 10/2000 Sano et al. ................. 455/566

* cited by examiner

Primary Examiner—Amr A. Awad
(74) Attorney, Agent, or Firm—Rosenberg, Klein & Lee

(57) ABSTRACT

The electromagnetic-induction system of the present invention comprises: a central processing unit (CPU); an application specific integrated circuit coupled with the central processing unit; a plurality of analogy switches that are coupled with the central processing unit and the application specific integrated circuit, individually; an antenna loop coupled with a plurality of analogy switches. The application specific integrated circuit further comprises: a digital filter that can reduce bandwidth error; a programmable gain amplifier that has the gain range with over eight-level; a latch device that can access the data at steady state; a multiplier and a divider that consist of hardware to increase the report rate; a programmable frequency generator can output the signal with the stable frequency.

28 Claims, 3 Drawing Sheets

APPLICATION SPECIFIC INTEGRATED CIRCUIT (ASIC) OF THE ELECTROMAGNETIC-INDUCTION SYSTEM

BACKGROUND OF THE INVENTION

1. Field of the Invention

The present invention relates generally to an electromagnetic-induction system, and more particularly to the electromagnetic-induction system with an application specific integrated circuit (ASIC).

2. Description of the Prior Art

Because a handwriting recognition system could replace the mouse, and is more suitable than the mouse to let the user input words and patterns by user's hands, improvement of the handwriting recognition system is a hot and important field of current computer technology. The original intention of the handwriting recognition system is to replace the mouse. As usual, to enhance the user's convenience, a handwriting recognition system would usually replace the mouse by both tablet and electromagnetic-induction pen thereof. Herein, the nib of electromagnetic-induction pen usually corresponds to the left button of the mouse. Conventional handwriting recognition systems have been developed for many years, but these products are applied to perform only one function, such as drawing or inputting a word.

In the conventional system with cordless pressure-sensitivity and electromagnetic-induction, there are usually a digitizer tablet and a transducer/cursor in the form of a pen or a puck. As is well known, there are two operation modes for determining the position of a pointing device on the surface of a digitizer tablet, wherein one is a relative mode, and the other is an absolute mode. A mouse device operates in a relative mode. The computer sensing the inputs from a mouse recognizes only relative movements of the mouse in X and Y directions as it is slid over the surface on which it is resting. If the mouse is lifted and repositioned on the surface, no change in the signal to the computer will be detected. A common approach uses a sensing apparatus inside the mouse to develop a pair of changing signals corresponding to the longitudinal and transversal movements of the mouse. On the contrary, a cursor device in a digitizer tablet system, such as electromagnetic-induction pen, operates in an absolute mode. If a cursor device is lifted and moved to a new position on its supporting surface, its signal to a computer will change to reflect the new absolute position of the cursor device. Nowadays, various methods have been used to determine the position of a cursor device on the surface of its supporting tablet, wherein one common skill which is applied for the absolute mode is electromagnetic field sensing.

Early transducer/cursors were connected to the tablet by means of a multi-conductor cable through which the position and button/pressure information are transferred virtually without any problem. The cordless transducer/cursors in some of the prior arts have attempted to use frequency and/or phase changes to transmit the non-positional status of the transducer/cursor functions such as buttons pushed, pen pressure, or the like. However, if there is no sophisticated processing, frequency and phase changes are very prone to false reading resulting from several outside factors such as metal objects, noise, wireless electromagnetic wave and so on. These problems become more apparent, especially in a larger digitizer tablet. Improvements have also been made in the prior arts to allow a user to use pointing devices on a digitizer tablet system in dual modes of operation that can provide information of either a relative movement or an absolute position under the control of the user.

Usually, a handwriting recognition system is a device with cordless pressure-sensitivity and electromagnetic-induction. Refer to FIG. 1, it shows a circuit block diagram of a conventional cordless pressure-sensitive and electromagnetic-induction device. Conventional cordless pressure-sensitivity and electromagnetic-induction device comprises: an electromagnetic-induction pen and a tablet. There is an oscillating circuit that consists of LC in the electromagnetic-induction pen. If the pen point is touched, the amount of inductance will be changed that results in the variation of oscillating frequency. The amount of inductance is increased when touching the pen point and increasing pressure so the variation of oscillating frequency is also increased. Therefore, the variation of the pressure on the pen point can be detected by way of the variation of oscillating frequency. There are two switches on the sidewall of the electromagnetic-induction pen, the emitted frequency of the electromagnetic-induction pen can be changed with the capacitance variation of the LC device that is produced by pushing down or setting free the switches. Furthermore, the tablet comprises a detector, an amplifier and an analog-digital converter. In the conventional tablet, there is a detected loop in the center region of the tablet, with one-way antennas located on the double faces of the detected loop, wherein the one-way antennas are equidistantly arranged in order by way of using array. The main purpose of the one-way detected loop is only applied to receive the electromagnetic wave that is emitted by the electromagnetic-induction pen. When the electromagnetic-induction pen emits the electromagnetic wave, the one-way antennas receive the electromagnetic wave, and then the tablet can obtain correlative information by the electromagnetic induction.

In general, because the design of conventional electromagnetic-induction apparatus is restricted by amount of devices and cost thereof, it only use the programmable amplifier with eight-level gain at the utmost, that is, the programmable amplifier has eight gain-scope of band thereof at the utmost, so that the gain-control is performed by using the analogy switches are eight at the utmost. The various gain-value can be chosen according to degree of signal (strong or weak). When the signal with the large variation transmitted into the analogy switches, the saturated signal is due to eight-level gain at the utmost that results in the handwriting defect, especially, it is harmful to linear. Furthermore, a plurality of adders and subtracters are commonly designed and employed in the conventional electromagnetic-induction apparatus so as to calculate the data. Particularly, when the conventional electromagnetic-induction apparatus applies the central processing unit (CPU) with low speed, it must use the plurality of adders and subtracters to simulate the operations of multiplication and division that results in reduction of the report rate of the electromagnetic-induction apparatus. Moreover, the conventional electromagnetic-induction apparatus outputs the frequency signal by using a program and then the analogy switch transmits it to antenna, so that the frequency signal with unsteady state is generated. Therefore, the central processing unit (CPU) continuously proceeds to the operation that results in increase of processing time thereof. Also, the electromagnetic pen receives the unstable power whereby the digital tablet inducts the energy with unsteady state. On the other hand, in order to reduce the cost in the conventional electromagnetic-induction apparatus, the data are directly obtained from the frequency counter that causes the accessed data from the frequency counter are unstable too.

In accordance with the above description, a large amount of electronic devices are employed for designing the conventional electromagnetic-induction apparatus to additionally combine with the printed circuit board (PCB) and the cost are increased. Additionally, some of the devices with various functions are difficult to be installed into the finite space within the electromagnetic-induction apparatus that limits development of functions within the electromagnetic-induction apparatus. Moreover, it is necessary that many analogy devices are also employed for designing the conventional electromagnetic-induction apparatus, so that the quality is reduced, also. In view of these, an application specific integrated circuit (ASIC) of the electromagnetic-induction system is therefore necessary, so as to strengthen and increase the functions of the electromagnetic-induction apparatus.

SUMMARY OF THE INVENTION

In accordance with the present invention, an application specific integrated circuit (ASIC) of the electromagnetic-induction system is provided that substantially overcomes the drawbacks of above mentioned problems from the conventional system and strengthen and increase the functions.

Accordingly, it is an object of the present invention to provide an application specific integrated circuit of the electromagnetic-induction system. The present invention can apply an application specific integrated circuit to couple with a central processing unit (CPU) and a plurality of passive devices, or to combine with a central processing unit (CPU), so as to reduce amount of the electronics devices. Therefore, area of the printed circuit board (PCB) can be reduced by using the present invention so as to decrease the product size; especially, the cycle time for producing the electromagnetic-induction system is also decreased. In light of the system test and service, this invention can assure the product quality, and simply and rapidly service the product. Therefore, this invention corresponds to economic effect and utilization in industry.

Another object of the present invention is to combine an adder and a subtracter within an application specific integrated circuit of the electromagnetic-induction system. This invention can apply the adder and the subtracter that consists of hardware to increase the processing rate of the central processing unit (CPU). Furthermore, this invention uses a programmable frequency generator to continuously output the signal with stable frequency at the steady state, so as to receive fixed power by the electromagnetic-induction pen, and induct stable energy by the digital tablet. Therefore, this invention can reduce the processing time of the central processing unit (CPU) and strengthen the efficacy of the electromagnetic-induction system.

Another object of the present invention is to combine a latch device within an application specific integrated circuit of the electromagnetic-induction system. This invention can avoid frequency variation by directly accessing data from the latch device, so as to obtain stable data. Moreover, this invention applies a digital filter to prevent over bandwidth error. Additionally, the present invention uses a programmable gain amplifier with the gain ranges more than eight-level and amount of analogy switches are over eight, so as to receive the signal with the large variation, whereby the handwriting defect is prevented by way of using the present invention.

In accordance with the present invention, a new electromagnetic-induction system is provided. The electromagnetic-induction system of the present invention comprises: a central processing unit (CPU); an application specific integrated circuit coupled with the central processing unit; a plurality of analogy switches that are coupled with the central processing unit and the application specific integrated circuit, individually; an antenna loop coupled with a plurality of analogy switches. The application specific integrated circuit further comprises: a digital filter that can reduce bandwidth error; a programmable gain amplifier that has the gain range with over eight-level; a latch device that can access the data at steady state; a multiplier and a divider that consist of hardware to increase the report rate; a programmable frequency generator can output the signal with the stable frequency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
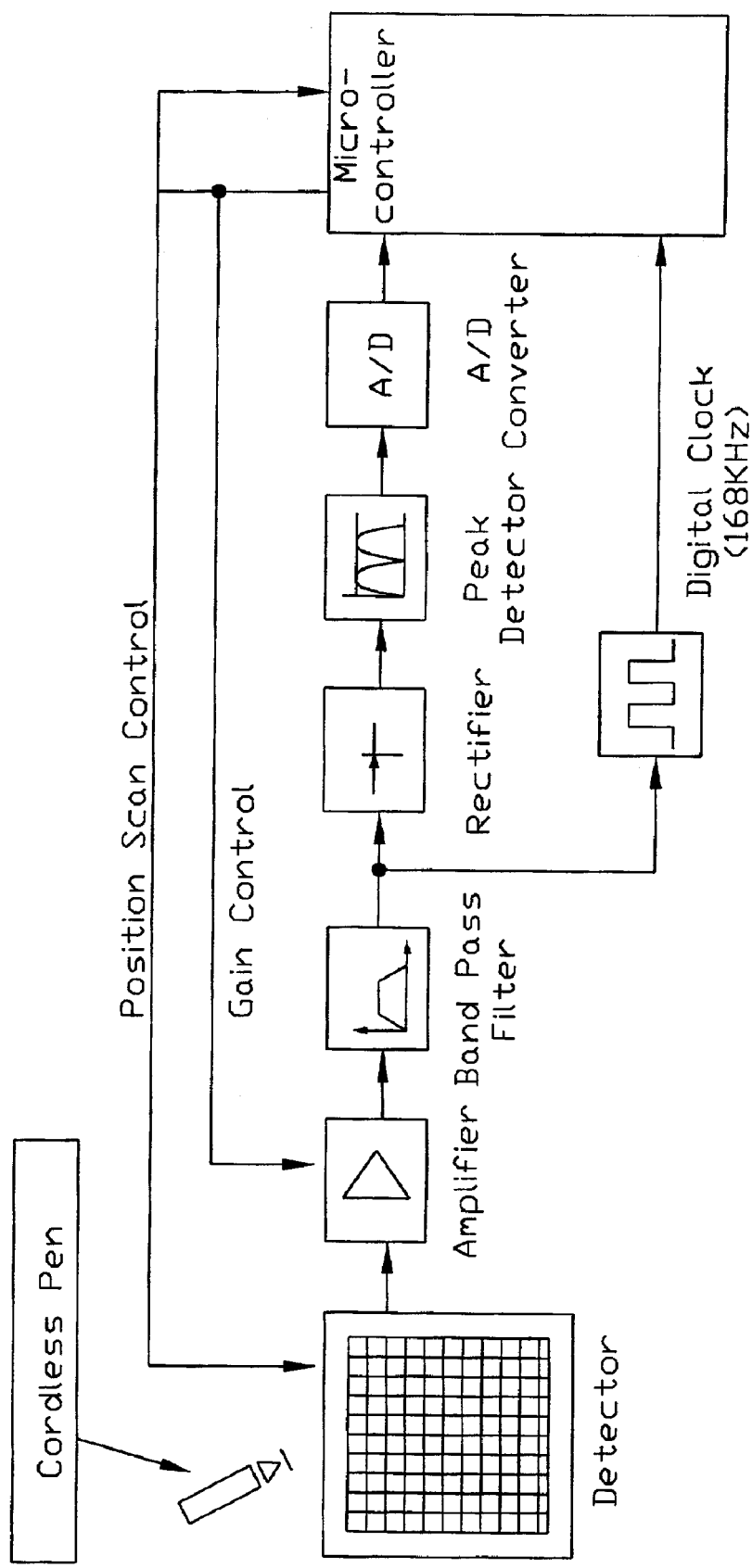
FIG. 1 shows cross-sectional views illustrative of block diagram of the conventional electromagnetic-induction apparatus.
Figure 2:
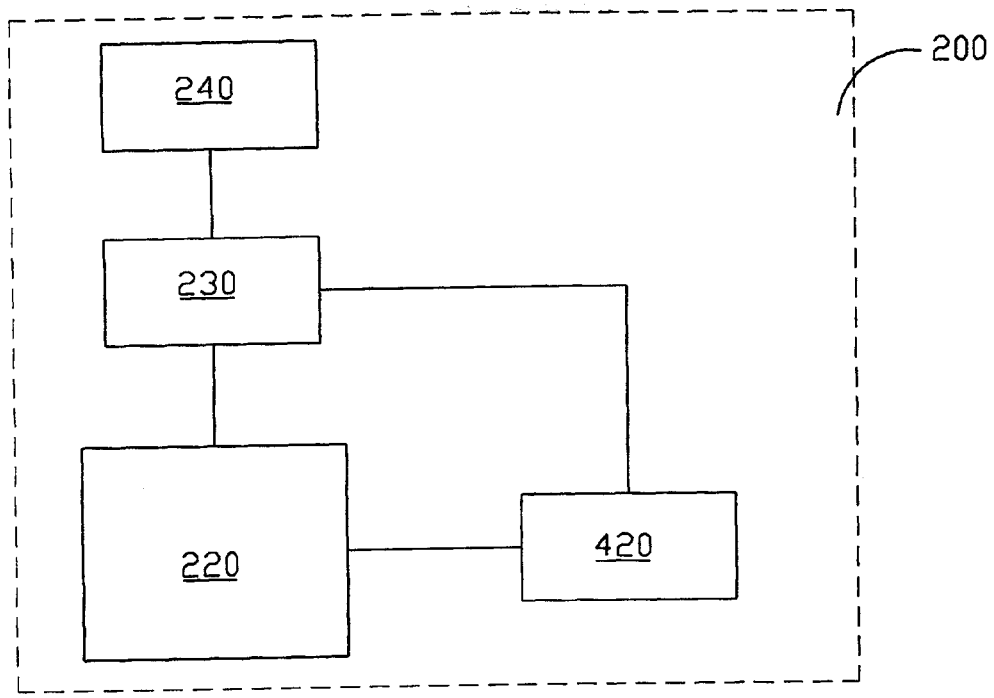
FIG. 2 shows block diagram of the electromagnetic-induction system in accordance with the first embodiment of the present invention.

As illustrated in FIG. 2, in the first embodiment of the present invention, first of all, an electromagnetic-induction system 200 is provided. The electromagnetic-induction system 200 comprises: a control sub-circuit 210, such as a micro-controller; an application specific integrated circuit (ASIC) 220, the application specific integrated circuit (ASIC) 220 is coupled with the control sub-circuit 210, wherein the application specific integrated circuit (ASIC) 220 comprises a programmable gain amplifier, a multiplier and/or a divider, a latch device, a digital filter and a programmable frequency generator; an analogy-switch group 230, the analogy-switch group 230 is individually coupled with the control sub-circuit 210 and the application specific integrated circuit (ASIC) 220; an antenna loop 240, the antenna loop 240 is coupled with the analogy-switch group 230.

In accordance with the present invention, the programmable gain amplifier has at least one-level of gain region, and the amount of the switches in the analogy-switch group 230 is equal to that of gain regions so as to control the antenna loop 240 to receive signal with the large variation.

Furthermore, the electromagnetic-induction system 200 accesses the frequency data by way of the latch device of the application specific integrated circuit (ASIC) 220; and further, it can controls the programmable frequency generator of the application specific integrated circuit (ASIC) 220 by the control sub-circuit 210 to generate a signal with a predetermined frequency, whereby the antenna loop 240 can emit the signal and keep the predetermined frequency thereof.

Figure 3:
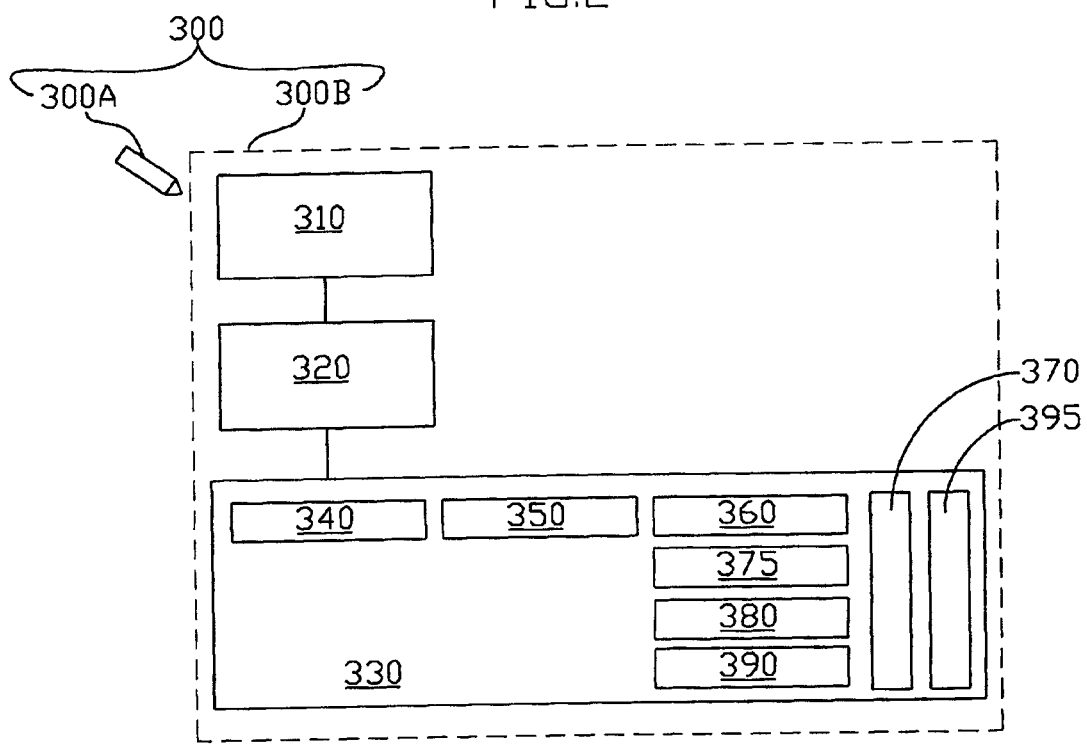
FIG. 3 shows block diagram of the electromagnetic-induction system in accordance with the second embodiment of the present invention.

As illustrated in FIG. 3, in the second embodiment of the present invention, first of all, an electromagnetic-induction apparatus 300 is provided, wherein the electromagnetic-induction apparatus 300 comprises an electromagnetic-induction pen 300A and a digital tablet 300B. The digital tablet 300B comprises: an antenna loop 310 for receiving frequency signal that is emitted by the electromagnetic-induction pen 300A; an analogy-switch group 320, the analogy-switch group 320 is coupled with the antenna loop 310 and control the antenna loop 310 for receiving or emitting a signal with a special frequency; an application specific integrated circuit (ASIC) 330, the application specific integrated circuit (ASIC) 330 is coupled with the analogy-switch group 320, wherein the method for forming the application specific integrated circuit (ASIC) 330 comprises a complementary metal-oxide semiconductor (CMOS) process, and thus, the application specific integrated circuit (ASIC) 330 can avoid generating negative voltage to retrench the power and to reduce the cost.

Referring to FIG. 3, in this embodiment, the application specific integrated circuit (ASIC) 330 comprises: a digital filter 340, the digital filter 340 can filter out the noise transmitted from the analogy-switch group 320; a programmable gain amplifier 350 that has the gain ranges with over eight-level to receive frequency signal with the large variation, and the programmable gain amplifier 350 receives the frequency signal transmitted from the digital filter 340 to strengthen the frequency signal, wherein the amount of the switches in the analogy-switch group 230 is equal to that of gain regions; a frequency counter 360 for receiving and counting the frequency data and a latch device 375 that is connected with the frequency counter 360 to receive the frequency data, the latch device 375 can prevent the frequency data from being outputted at unsteady state; a multiplexer (MUL) 370, the multiplexer (MUL) 370 receives signals individually transmitted from the latch device 375 and an operator 380, wherein the operator 380 comprises a divider or a multiplier, the operator 380 can be coupled with the application specific integrated circuit (ASIC) 330 from each other, or that can be directly combined within the application specific integrated circuit (ASIC) 330 by the complementary metal-oxide semiconductor (CMOS) process, whereby the processing rate is increased to raise the report rate of the digital tablet 300B; a programmable frequency generator 390, the programmable frequency generator 390 can generate a signal with the predetermined frequency and keep that, whereby the electromagnetic-induction pen 300A receives the stable power emitted from the antenna loop 310, and the antenna loop 310 can also receive the stable energy; a micro-controller 395, the micro-controller 395 individually accesses the signals from the multiplexer (MUL) 370 and the programmable frequency generator 390.

Figure 4:
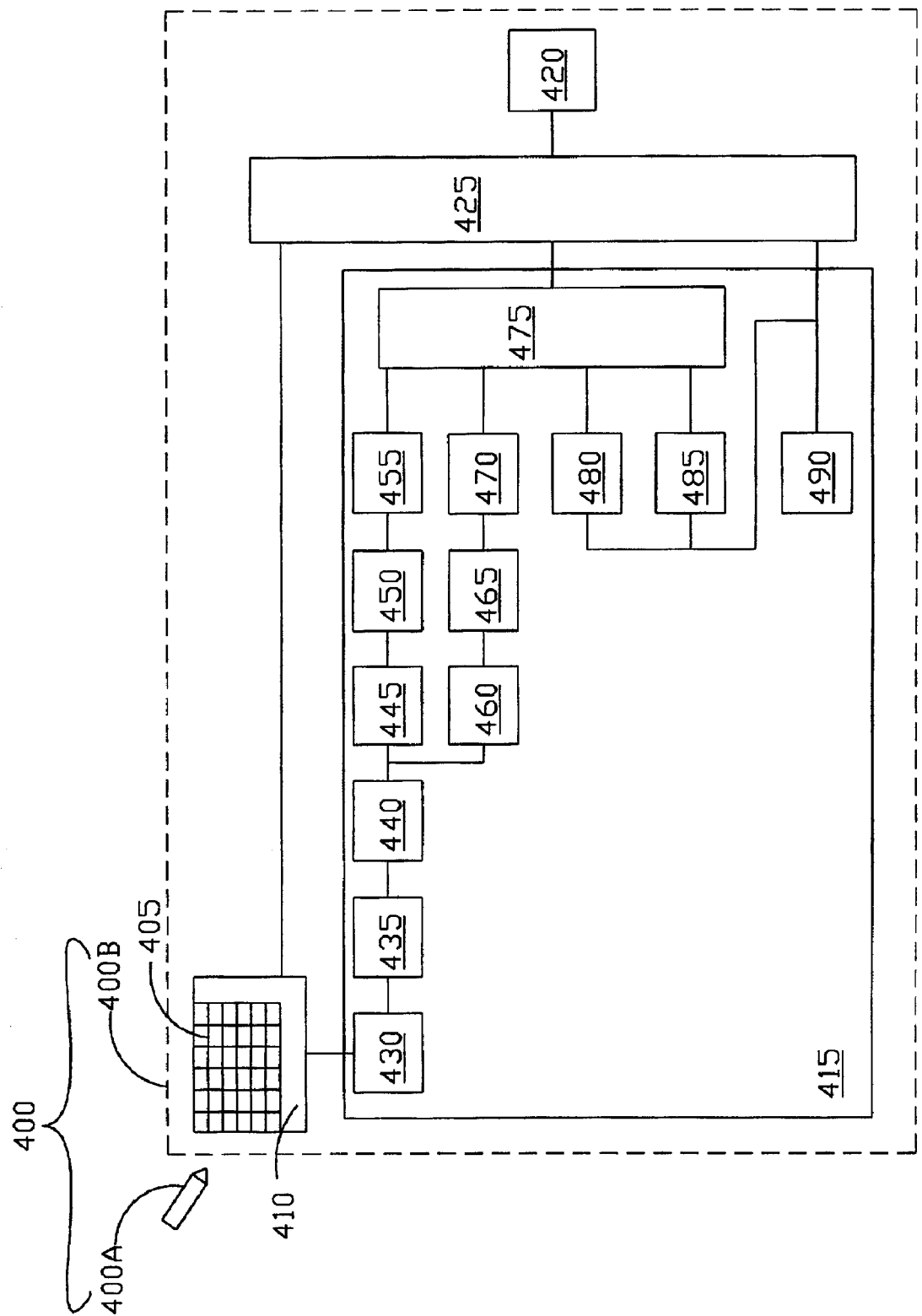
FIG. 4 shows block diagram of the electromagnetic-induction system in accordance with the third embodiment of the present invention.

As illustrated in FIG. 4, in the third embodiment of the present invention, first of all, an electromagnetic-induction apparatus 400 is provided, wherein the electromagnetic-induction apparatus 400 comprises an electromagnetic-induction pen 400A and a digital tablet 400B. The digital tablet 400B comprises: an antenna loop 405 for receiving the frequency signal that is emitted by the electromagnetic-induction pen 300A; an analogy-switch group 410, the analogy-switch group 410 is coupled with the antenna loop 405 and control the antenna loop 405 for receiving or emitting a signal with a special frequency, wherein the analogy-switch group 410 comprises sixty four analogy switches; an application specific integrated circuit (ASIC) 415, the application specific integrated circuit (ASIC) 415 is coupled with the analogy-switch group 410, wherein the method for forming the application specific integrated circuit (ASIC) 415 comprises a complementary metal-oxide semiconductor (CMOS) process, and thus, the application specific integrated circuit (ASIC) 415 can avoid generating negative voltage to retrench the power and to reduce the cost; a microprocessor unit 420, the microprocessor unit 420 is individually coupled with the application specific integrated circuit (ASIC) 415 and the analogy-switch group 410 via a two-way bus 425, the microprocessor unit 420 can control the analogy-switch group 410 with the time-sharing and multitasking method to switch the antenna loop 405.

Referring to FIG. 4, in this embodiment, the application specific integrated circuit (ASIC) 415 comprises: an amplifier 430, the amplifier 430 is coupled with the analogy-switch group 410 to receive the signal thereof; a digital filter 435, the digital filter 435 can filter out the noise transmitted from the amplifier 430; a programmable gain amplifier 440 with the sixty four gain ranges to receive frequency signal with the large variation, and the programmable gain amplifier 440 receives the signal transmitted from the digital filter 435 to perform a process for gaining signal; a rectifier 445, the rectifier 445 receives the signal transmitted from the programmable gain amplifier 440 to form a direct current signal; a peak detector 450, the peak detector 450 receives the direct current signal transmitted from the rectifier 445 to obtain the peak value of the direct current signal; a analog/digital converter (A/D converter) 455, the analog/digital converter 455 receives the peak value transmitted from the peak detector 450 to transform that into a digital signal; a shaping circuit 460, the shaping circuit 460 receives the signal transmitted from the programmable gain amplifier 440 to form a digital clock signal; a counter 465, the counter 465 receive the digital clock signal transmitted from the shaping circuit 460 to calculate the frequency data; a latch device 470, the latch device 470 receives the frequency data transmitted from the counter 465 so as to output the special data with the steady state; a digital multiplexer (DMUL) 475, the digital multiplexer (DMUL) 475 individually receives the digital signal from the analog/digital converter 455, the special data from the latch device 470, the data from a multiplier 480 and a divider 485, and the digital multiplexer (DMUL) 475 transmits the data in order into the microprocessor unit 420 via a two-way bus 425, wherein the multiplier 480 and the divider 485 can individually receive the data transmitted by the microprocessor unit 420 via the two-way bus 425 to perform the operation; and further, both the multiplier 480 and the divider 485 can simultaneously be formed and combined with the application specific integrated circuit (ASIC) 415, or the application specific integrated circuit (ASIC) 415 only has one of those (the multiplier 480 and the divider 485), and the other is coupled with the application specific integrated circuit (ASIC) 415; a programmable frequency generator 490, the programmable frequency generator 490 can receive the signal of the microprocessor unit 420 via the two-way bus 425 to generate the signal with the special frequency.

In these embodiments of the present invention, the present invention can apply an application specific integrated circuit to couple with a central processing unit (CPU) and a plurality of passive devices, or to combine with a central processing unit (CPU), so as to reduce amount of the electronics devices. Therefore, area of the printed circuit board (PCB) can be reduced by using the present invention so as to decrease the product size; especially, the cycle time for producing the electromagnetic-induction system is also decreased. In light of the system test and service, this invention can assure the product quality, and simply and rapidly service the product. Therefore, this invention corresponds to economic effect and utilization in industry.

Of course, it is possible to apply the present invention for the electromagnetic-induction system, and to any electromagnetic-induction system with the application specific integrated circuit (ASIC). Also, the application specific integrated circuit (ASIC) of the present invention are applied to strengthen functions of the digital tablet and increase the processing rate of the central processing unit (CPU) concerning the electromagnetic-induction system has not been developed at present.

Obviously, many modifications and variations of the present invention are possible in light of the above teachings. It is therefore to be understood that within the scope of the appended claims, the present invention may be practiced otherwise than as specifically described herein.

Although specific embodiments have been illustrated and described, it will be obvious to those skilled in the art that various modifications may be made without departing from what is intended to be limited solely by the appended claims.

What is claimed is:

1. An electromagnetic-induction system, said electromagnetic-induction system comprising:
   an antenna loop for receiving and emitting the electromagnetic wave with a specific frequency;
   an analogy-switch group being coupled with said antenna loop;
   a control sub-circuit being coupled to said analogy-switch group;
   a first operator being coupled to said control sub-circuit and receiving the signal from said control sub-circuit to perform operation; and
   an application specific integrated circuit, being individually coupled to said control sub-circuit said analogy-switch group and said first operator, wherein said application specific integrated circuit comprises:
      a filter being coupled to said analogy-switch group and receiving the signal from said analogy-switch group;
      a gain amplifier being coupled to said filter and receiving the signal from said filter;
      a second operator being coupled to said control sub-circuit and receiving the signal from said control sub-circuit to perform operation;
      a frequency generator being coupled to said control sub-circuit and receiving the signal from said control sub-circuit so as to generate the special frequency;
      a counter; and
      a latch device being coupled to said counter and receiving the signal from said counter.

2. The electromagnetic-induction system according to claim 1, wherein said control sub-circuit comprises a two-way bus, wherein said control sub-circuit is coupled with said application specific integrated circuit, said first operator and said analogy-switch group by way of said two-way bus.

3. The electromagnetic-induction system according to claim 1, wherein said first operator comprises a divider.

4. The electromagnetic-induction system according to claim 3, wherein said second operator comprises a multiplier.

5. The electromagnetic-induction system according to claim 1, wherein said first operator comprises a multiplier.

6. The electromagnetic-induction system according to claim 5, wherein said second operator comprises a divider.

7. The electromagnetic-induction system according to claim 1, wherein the method for forming said application specific integrated circuit comprises a complementary metal-oxide semiconductor process.

8. The electromagnetic-induction system according to claim 1, wherein said application specific integrated circuit comprises a multiplexer.

9. The electromagnetic-induction system according to claim 1, wherein said filter comprises a digital filter.

10. The electromagnetic-induction system according to claim 1, wherein said gain amplifier comprises a programmable gain amplifier.

11. The electromagnetic-induction system according to claim 10, wherein the gain regions of said programmable gain amplifier comprises eight-level at least.

12. The electromagnetic-induction system according to claim 1, wherein said frequency generator comprises a programmable frequency generator.

13. An application specific integrated circuit of the electromagnetic-induction system, said application specific integrated circuit comprising:
    a digital filter for receiving signal;
    a programmable gain amplifier being coupled to said digital filter and receiving the signal from said digital filter;
    a first sub-circuit being coupled to said programmable gain amplifier and receiving the signal from said programmable gain amplifier so as to transform into the digital signal;
    a second sub-circuit being coupled to said programmable gain amplifier and receiving the signal from said programmable gain amplifier so as to transform into the digital clock;
    a counter being coupled to said second sub-circuit and receiving the digital clock from said second sub-circuit so as to count the frequency data;
    a latch device being coupled to said second sub-circuit and receiving the frequency data from said second sub-circuit;
    at least one operator being coupled to said electromagnetic-induction system; and
    a programmable frequency generator for generating the signal with a predetermined frequency.

14. The application specific integrated circuit according to claim 13, wherein said application specific integrated circuit comprises a micro-controller.

15. The application specific integrated circuit according to claim 14, wherein said micro-controller comprises a two-way bus.

16. The application specific integrated circuit according to claim 13, wherein said application specific integrated circuit comprises a digital multiplexer, said digital multiplexer is individually coupled with said first sub-circuit, said second sub-circuit and said at least one operator.

17. The application specific integrated circuit according to claim 13, wherein the gain regions of said programmable gain amplifier comprises at least sixty four-level.

18. The application specific integrated circuit according to claim 13, wherein said first sub-circuit comprises:
    a rectifier being coupled to said programmable gain amplifier and receiving the signal from said programmable gain amplifier to form a direct current signal;

a peak detector being coupled to said rectifier and receiving the direct current signal from said rectifier so as to obtain the peak value of the direct current signal; and an analog/digital converter being coupled to said peak detector and receiving the peak value from said peak detector so as to transform into said digital signal.

19. The application specific integrated circuit according to claim 13, wherein said second sub-circuit comprises a shaping circuit coupled to receive the signal from said programmable gain amplifier so as to form a digital clock.

20. The application specific integrated circuit according to claim 13, wherein said at least one operator comprises a multiplier.

21. The application specific integrated circuit according to claim 20, wherein said application specific integrated circuit is coupled with a divider.

22. The application specific integrated circuit according to claim 13, wherein said at least one operator comprises said divider.

23. The application specific integrated circuit according to claim 22, wherein said application specific integrated circuit is coupled with a multiplier.

24. An application specific integrated circuit of a digital tablet in the electromagnetic-induction system, wherein said digital tablet comprises an antenna loop, an analog-switch group, said application specific integrated circuit comprising:

an amplifier being coupled to said analog-switch group a digital filter being coupled to said amplifier;

a programmable gain amplifier being coupled to said digital filter;

a rectifier being coupled to said programmable gain amplifier;

a peak detector being coupled to said rectifier;

an analog/digital converter being coupled to said peak detector so as to transform into said digital signal;

a shaping circuit being coupled to said programmable gain amplifier;

a counter being coupled to said shaping circuit;

a latch device being coupled to said counter;

a digital multiplexer being individually coupled to said analog/digital converter and said latch device;

a multiplier being coupled to said digital multiplexer;

a divider being coupled to said digital multiplexer;

a micro-controller being individually coupled to said digital multiplexer and said analog-switch group; and a programmable frequency generator being coupled to said micro-controller.

25. The application specific integrated circuit according to claim 24, wherein said analog-switch group comprises at least sixty four analogy switches.

26. The application specific integrated circuit according to claim 24, wherein said application specific integrated circuit is formed by the complementary metal-oxide semiconductor process.

27. The application specific integrated circuit according to claim 24, wherein the gain regions of said programmable gain amplifier are about at least sixty four-level.

28. The application specific integrated circuit according to claim 24, wherein said micro-controller comprises a two-way bus.

* * * * *